United States Patent
Uneme et al.

(10) Patent No.: US 6,539,583 B1
(45) Date of Patent: Apr. 1, 2003

(54) FRICTIONAL HINGE DEVICE AND A PORTABLE BUSINESS DEVICE HAVING THE HINGE DEVICE INCORPORATED THEREINTO

(75) Inventors: Masato Uneme, Aichi-ken (JP); Takaaki Hayashida, Aichi-ken (JP)

(73) Assignee: Chuo Hatsujo Kabushiki Kaisha, Nagoya (JP)

( * ) Notice: Subject to any disclaimer, the term of this patent is extended or adjusted under 35 U.S.C. 154(b) by 0 days.

(21) Appl. No.: 09/568,465

(22) Filed: May 10, 2000

(30) Foreign Application Priority Data

May 11, 1999 (JP) .............................. 11-130571
Apr. 28, 2000 (JP) ...................... 2000/131710

(51) Int. Cl.⁷ .............................................. E05D 11/08
(52) U.S. Cl. .............................. 16/342; 16/334; 16/347
(58) Field of Search .......................... 16/342, 337, 347, 16/338

(56) References Cited

U.S. PATENT DOCUMENTS

| | | | | |
|---|---|---|---|---|
| 4,162,813 A | * | 7/1979 | Mashburn et al. | 308/237 R |
| 4,630,332 A | * | 12/1986 | Bisbing | 16/273 |
| 4,638,544 A | * | 1/1987 | McNeil | 29/434 |
| 5,329,201 A | * | 7/1994 | Shirasaki | 310/323 |
| 5,509,176 A | * | 4/1996 | Karl | 16/342 |
| 5,943,738 A | * | 8/1999 | Karfiol | 16/342 |
| 6,116,806 A | * | 9/2000 | Chang | 403/145 |
| 6,230,365 B1 | * | 5/2001 | Lu | 16/342 |

FOREIGN PATENT DOCUMENTS

JP        7-26825        1/1995

* cited by examiner

*Primary Examiner*—Anthony Knight
*Assistant Examiner*—Mark Williams
(74) *Attorney, Agent, or Firm*—Morgan, Lewis & Bockius LLP

(57) ABSTRACT

In a frictional hinge device, a metallic shaft has a rotational axis as a rotational center. A support block is made of a synthetic resin so that the support block rotatably supports the metallic shaft relatively. The support block is relatively rotatable in relation with the metallic shaft by a surface friction resistance between the support block and the metallic shaft. A surface treatment imparts Vickers number (Hv) of 800 or more with an outer surface of the metallic shaft. As an alternative, a hardened layer is provided around the outer surface of the metallic shaft and the hardened layer has Vickers number (Hv) of 800 or more with its thickness at least in 5.0 μm.

3 Claims, 18 Drawing Sheets

Fig. 6

Properties of Hard Ceramic Materials

| | constituents | lattice structure | micro-hardness (kgf/mm$^2$) | density (g/cm$^3$) | melting point (°C) | thermal expansion (10$^{-6}$/°C) | thermal conductivity (cal/cm · s °C) | electrical resistance (Ω · cm) |
|---|---|---|---|---|---|---|---|---|
| oxides | Al$_2$O$_3$ | hexagonal | 2,100 | 4.3 | 2,030 | 8.6 | 0.072 | 10$^{14}$~10$^{16}$ |
| | BeO | hexagonal | 1,200 | 3.0 | 2,550 | 6~9 | 0.55 | >10$^{14}$ |
| | MgO | cubic | 600~900 | 3.6 | 2,800 | 11~15 | 0.17 | >10$^{14}$ |
| | TiO$_2$ | | 1,000 | 4.24 | 1,840 | 7~9 | 0.008~0.015 | >10$^{13}$ |
| | ZrO$_2$ | cubic (stable) | 1,300~1,500 | 6.27 | 2,500 | 7~10 | 0.005 | |
| | spinel MgO · Al$_2$O$_3$ | cubic | 1,540 | 3.58 | 2,135 | 8~9 | 0.04 | >10$^{14}$ |
| | mullite 3Al$_2$O$_3$ · 2SiO$_2$ | | 700~1,400 | 3.16 | | 4.5~5.5 | 0.007~0.015 | >10$^{14}$ |
| carbides | B$_4$C | rhombic | 4,900~5,000 | 2.5 | 2,350 | 4.5 | 0.07 | 0.3~0.8 |
| | SiC(α) | hexagonal | 2,000~3,000 | 3.2 | 2,100 metamorph. | 3.5~5.5 | 0.16~0.4 | 100~200 |
| | SiC(β) | cubic | 3,000~3,340 | 3.2 | | 4.3~4.5 | 0.1 | 107~200 |
| | TiC | cubic | 2,980~3,800 | 4.9 | 2,830 | 7.61 | 0.041 | 1.05×10$^{-4}$ |
| | VC | cubic | 2,800 | 5.7 | 3,180 | 6.5 | 0.010 | 1.56×10$^{-4}$ |
| | HfC | cubic | 2,700 | 12.7 | 2,830 | 6.73 | 0.015 | 1.95×10$^{-4}$ |
| | ZrC | cubic | 2,600 | 6.5 | 3,890 | 6.93 | 0.049 | 70×10$^{-6}$ |
| | NbC | cubic | 2,400 | 7.8 | 3,530 | 6.84 | 0.034 | 7.4×10$^{-5}$ |
| | WC | hexagonal | 2,000~2,400 | 15.8 | 3,480 | 6.2 | 0.090 | 1.2×10$^{-5}$ |
| | TaC | cubic | 1,800 | 14.5 | 2,730 | 6.61 | 0.053 | 30×10$^{-6}$ |
| | Mo$_2$C | hexagonal | 1,800 | 9.2 | 3,780 | 6.0 | 0.016 | |
| | Cr$_3$C$_2$ | rhombic | 1,300 | 6.7 | 2,400 | 10.3 | | |
| | W$_2$C | cubic | 3,000 | 17.2 | 2,860 | | | 8×10$^{-5}$ |

Fig.6a

Properties of Hard Ceramic Materials

| | constituents | lattice structure | micro-hardness (kgf/mm²) | density (g/cm³) | melting point (°C) | thermal expansion ($10^{-6}$/°C) | thermal conductivity (cal/cm·s·°C) | electrical resistance (Ω·cm) |
|---|---|---|---|---|---|---|---|---|
| nitride | TiN | cubic | 2,400 | 5.4 | 2,930 | 9.3 | 0.070 | $21.7 \times 10^{-6}$ |
| | VN | cubic | 1,500 | 6.1 | 2,050 | | 0.027 | $85.9 \times 10^{-6}$ |
| | HfN | cubic | 2,000 | 14.0 | 3,310 | | 0.0517 | $13.6 \times 10^{-6}$ |
| | ZrN | cubic | 1,900 | 7.3 | 2,980 | 6~7 | 0.033 | $200 \times 10^{-6}$ |
| | NbN | cubic | 1,400 | 8.4 | 2,050 decom. | | 0.009 | $13.5 \times 10^{-6}$ |
| | TaN | hexagonal | 1,300 | 14.1 | 3,090 | | | $17 \times 10^{12}$ |
| | BN | hexagonal | (Mohs 2) | 2.3 | 3,000 | 0.5~1.7 | 0.036~0.069 | $10^{13} \sim 10^4$ |
| | | cubic | 4,700 | 3.5 | (sublime&decom.) | 4.8 | 0.48 | $2 \times 10^{11}$ |
| | AlN | | 1,200 | 3.26 | (sublime&decom.) 2,450 | 6.0 | 0.048~0.072 | |
| | Si₃N₄ | | 3,300 | 3.2 | 1,900 sublime | 3 | 0.0226 | $10^{13} \sim 10^{14}$ |
| | CrN | | 2,000 | 6.1 | 1,500 decom. | | 0.021 | |
| boron-based compounds | TiB₂ | hexagonal | 3,400 | 4.52 | 2,980 | 8.1 | 0.058 | $12 \sim 28.4 \times 10^{-6}$ |
| | ZrB₂ | hexagonal | 2,200 | 6.09 | 3,040 | 5.5 | 0.055~0.060 | $9.2 \sim 38.8 \times 10^{-6}$ |
| | HfB₂ | hexagonal | | 11.2 | 3,060 | 5.3 | | $100 \sim 104 \times 10^{-6}$ |
| | TaB₂ | hexagonal | 1,700 | 12.6 | 3,000 | | 0.033 | $68 \sim 86.5 \times 10^{-6}$ |
| | MoB₂ | hexagonal | 1,280 | 7.8 | 2,100 | | | $22.5 \sim 45 \times 10^{-6}$ |
| | CrB₂ | hexagonal | 1,700 | 5.6 | 2,760 | 4.6 | 0.04 | $21 \times 10^{-6}$ |
| | MoB | tetragonal | 1,570 | 8.8 | 2,180 | | | $40 \sim 50 \times 10^{-6}$ |
| | NbB | rhombic | (old Mohs 8) | 7.2 | >2,900 | | | $32 \times 10^{-6}$ |
| | UB₂ | hexagonal | 1,600 | 5.1 | 2,100 | | | $35 \times 10^{-6}$ |
| | MoB₂ | tetragonal | 1,660 | 9.3 | 2,000 | | | $40 \times 10^{-6}$ |
| carbon | graphite | hexagonal | (Mohs 1~2) | 2.2 | 3,650 sublime | 1~3.5 | 0.25~0.58 | $0.4 \sim 1.2 \times 10$ |
| | diamond | cubic | 8,000~10,000 | 3.5 | 2,000 graphitize | 0.8 | 6~21 | $10^{12} \sim 10^{15}$ |

FRICTIONAL HINGE DEVICE AND A PORTABLE BUSINESS DEVICE HAVING THE HINGE DEVICE INCORPORATED THEREINTO

BACKGROUND OF THE INVENTION

1. Field of the Invention

The invention relates to a frictional hinge device which is used to pivotably support a lid plate and a display of a portable business device such as a laptop note type personal computer, and particularly concerns to a frictional hinge device used to hold the lid plate and the display at a desired angular position by friction.

2. Description of Prior Art

In this type of the frictional hinge device, a lid plate is secured to a metallic shaft which is rotatably supported on a holder block metal. The holder block metal clamps the metallic shaft to produce a surface friction between the holder block metal and the metallic shaft so as to hold the lid plate at a desired angular position.

Although this makes a whole structure simple and contributes to cost reduction, a certain quantity of grease is required for lubrication between the holder block metal and the metallic shaft. The grease becomes a likely cause of perimetric pollution around the frictional hinge device.

In order to avoid these inconveniences, a shaft lock device is disclosed by Laid-open Japanese Patent Application No. 7-26825 (laid-open on Jan. 27, 1995, assigned to Kabushiki Kaisha Kato Manufacturing Factory). This teaches that an outer shaft is made of a synthetic resin and integrally molded with an inner shaft. Due to a surface friction resistance caused from a thermal expansional difference between the inner and outer shafts, it is possible to hold the inner shaft at a desired angular position while permitting the inner shaft to pivot relative to the outer shaft against the surface friction resistance therebetween. This surface friction resistance holds a display of a note type personal computer at the desired angular position.

In the shaft lock device disclosed by the Laid-open Japanese Patent Application No. 7-26825, a surface roughness, surface treatment and frictional coefficient are suggested as means to determine the frictional torque between the inner and outer shafts together with their diametrical dimensions.

However, this disclosure remains silent about qualitative and quantitative analyses on a relationship between the inner and outer shafts. This causes no smaller variations on the frictional torque when the inner shaft pivotally moves in relative to the outer shaft. This also causes abnormal noise due to a stickslip phenomenon when pivotally moving the inner shaft, thereby losing a good endurance with the frictional torque reduced due to an unacceptable amount of wear between the inner and outer shafts.

Therefore, the present invention has been made with the above drawbacks in mind, it is a main object of the invention to provide a frictional hinge device which is inexpensive with no fear for perimetric pollution and no abnormal noise due to a stickslip phenomenon with the least torque variations and is capable of maintaining a stable surface friction resistance between a shaft member and a support member for an extended period of time so as to repeatedly hold the support member at a desired angular position based on the surface friction resistance.

SUMMARY OF THE INVENTION

With a frictional hinge device having a support member rotatably supported by a metallic shaft member, a support member is integrally molded around the metallic shaft member when a synthetic resin is injected into a mold cast in which the metallic shaft member is placed beforehand.

The synthetic resin is contracted when solidified, the support member tightly engages with the metallic shaft member. Due to selection of materials or provision of a surface treatment, an outer surface of the metallic shaft member has Vickers number (Hv) of 800 or more. This provides a good surface friction resistance therebetween. When the support member is subjected to a frictional torque greater than the surface friction resistance, the support member pivots around the metallic shaft member relatively. When the support member is subjected to a frictional torque less than the surface friction resistance, the support member is held at an appropriate angular position by the surface friction resistance.

With the synthetic resin molded around the metallic shaft member, it is possible to reduce a manufacturing cost.

With the outer surface of the metallic shaft member treated so that it has Vickers number (Hv) of 800 or more, it is possible to hold e.g., 30000 times of opening and closure operations with the least wear between the metallic shaft member and the support member. This insures a long service life because a torque holding rate (%) is improved {(i.e., torque measured after undergoing a heat deteriorating experimental test or endurance experimental test)/(initial torque)}×100. This also reduces frictional torque variations and a stickslip phenomenon significantly with no abnormal noise due to the stickslip phenomenon when the support member pivots in relative to the metallic shaft member. With the invariable surface friction resistance thus maintained substantially, it is possible to readily hold the support member at a desired angular position, and securing a stable surface friction resistance for an extended period of time with a good durability.

With the synthetic resin molded around the metallic shaft member to produce the surface friction resistance, the need of applying the grease is eliminated to dissolve the fear for perimetric pollution.

With a hardened layer provided around an outer surface of the metallic shaft member, the torque holding rate is improved. By determining the hardened layer at least 5.0 μm in thickness, the stable surface friction resistance is maintained between the support member and the metallic shaft member for an extended period of time.

Since an alteration of Vickers number (Hv) leads to appropriately adjusting the surface friction resistance between the support member and the metallic shaft member, a necessary surface friction resistance is readily selected as desired in accordance with types of the frictional hinge devices.

With one or more circumferential grooves provided on the outer surface of the metallic shaft member, the support member tends to engage more tightly against the metallic shaft member so that the surface friction resistance is reinforced between the support member and the metallic shaft member so as to insure an enhanced frictional torque therebetween. This makes the frictional hinge device compact as a whole in comparison with a higher frictional torque insured.

With the frictional hinge device used to pivotably move a display for a portable business device, it is possible to hold the display at any desired angular position to insure a good view on the display.

With the synthetic resin applied to the support member in which a bending elasticity fluctuates as small as up to 30% under an operating temperature ranging from e. g., −20 to 80° C., it is possible to maintain a sufficient surface friction resistance against the metallic shaft member even when the normal ambient temperature fluctuates. This prevents deterioration of friction surfaces of the support member and the metallic shaft member so as to maintain the stable surface friction resistance for an extended period of time.

By way of illustration, the synthetic resin is represented by PC (polycarbonate), PAR (polyarylate), PPS (polyphenylene sulphide) and the like.

With the synthetic resin mixed with an organic or inorganic antifriction medium, it is possible to impart a smooth pivotal movement with the shaft member. As opposed to the case in which lubrication agent is applied between the support member and the shaft member, it is possible to prevent the perimeter from being polluted. Due to a difference of hardness between the support member and the metallic shaft member, it is possible to exceedingly reduce the wear dust produced between the support member and the shaft member, thereby maintaining the stable surface friction resistance therebetween for an extended period of time.

By mixing the synthetic resin with fibrous material to improve its mechanical strength, it is possible to ameliorate an endurance of the support member.

BRIEF DESCRIPTION OF THE DRAWINGS

Preferred forms of the present invention are illustrated in the accompanying drawings in which:

FIGS. 6 and 6a are tables showing properties of various hard ceramic materials;

DETAILED DESCRIPTION OF THE PREFERRED EMBODIMENTS

Figure 1:
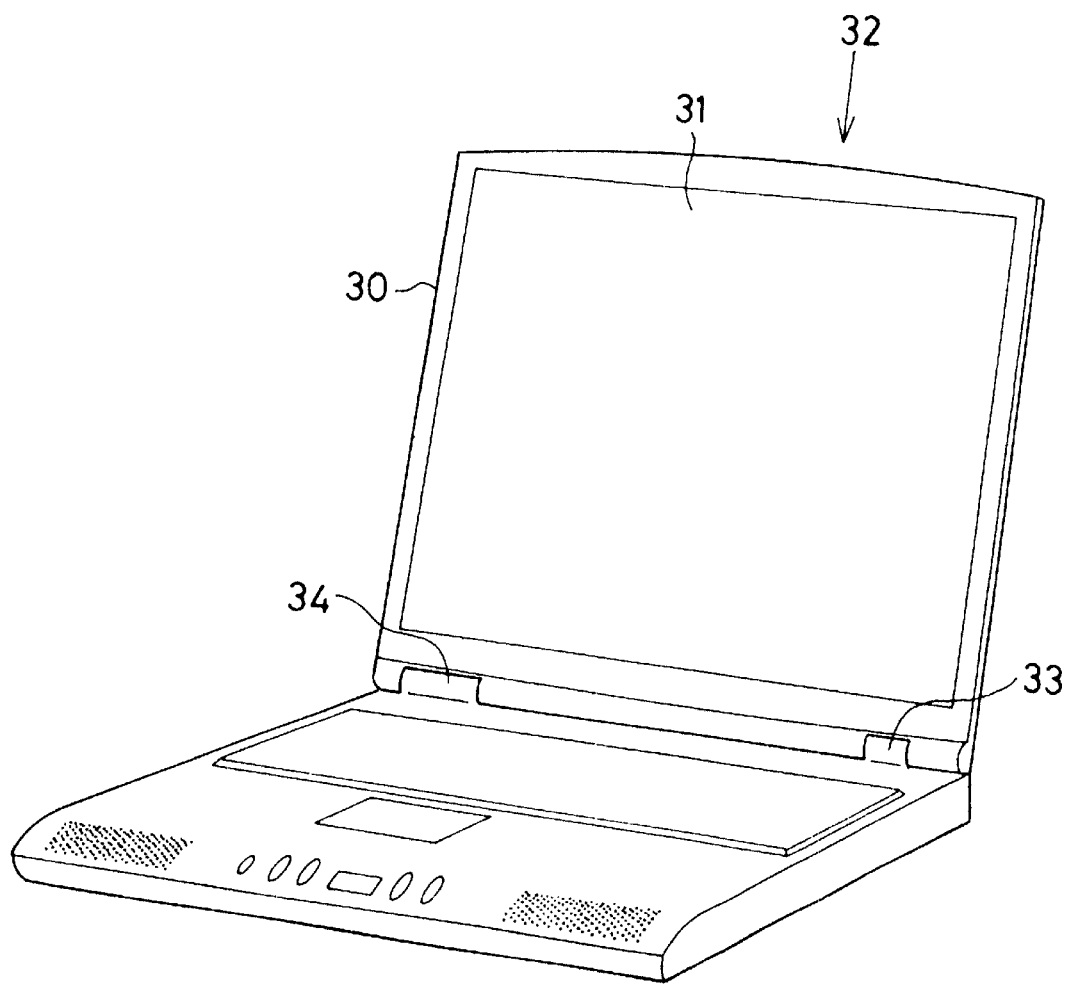
FIG. 1 is a perspective view of a laptop note type personal computer into which a frictional hinge device is incorporated according to a first embodiment of the invention.
Figure 2:
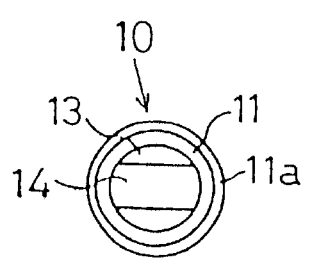
FIG. 2 is a side elevational views of a metallic shaft member of the frictional hinge device.

Referring to FIGS. 1 through 2, a frictional hinge device 1 is used at lower ends 33, 34 to pivotally move a lid plate 30 for a liquid crystal display 31 in a laptop note type personal computer (portable business device) 32 as shown in FIG. 1. The lid plate 30 is adjusted at the desired angular position to insure a good view on the liquid crystal display 31.

Figure 1A:
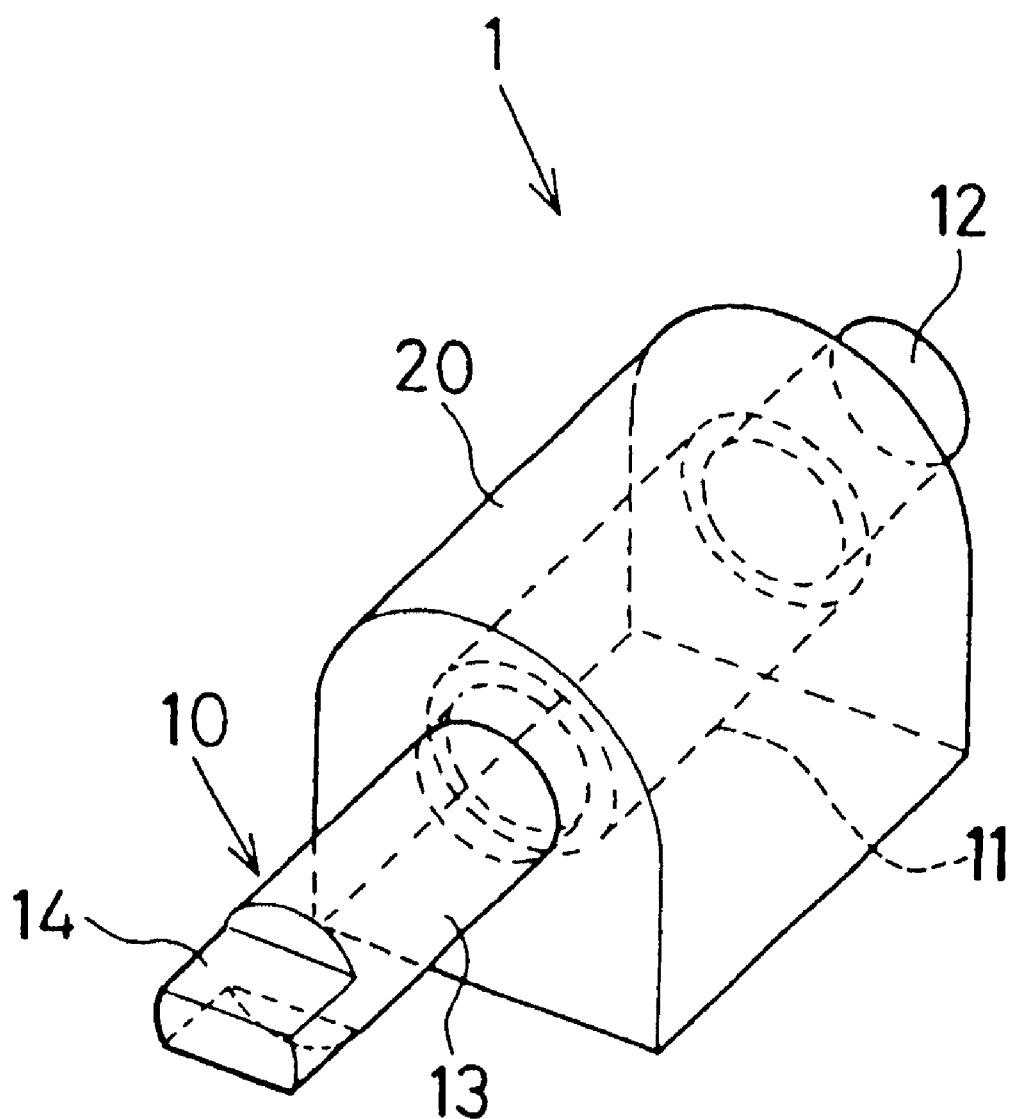
FIG. 1a is a perspective view of the frictional hinge device.

As shown in FIG. 1a, the frictional hinge device 1 has a metallic shaft 10 which serves as a rotational axis of a rotational center. The metallic shaft 10 is secured to the lid plate 30 of the personal computer 32 to pivotally move in unison with the lid plate 30. A support block 20 is provided to pivotably support the metallic shaft 10 in relative to the support block 20.

Figure 3:
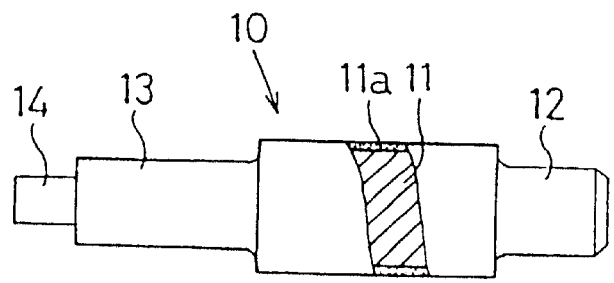
FIG. 3 is a plan view of the metallic shaft member of the frictional hinge device but partly sectioned.

As depicted in FIGS. 2, 3, the metallic shaft 10 is in the form of a columnar configuration, and an outer surface of the metallic shaft 10 is 800 or more in terms of Vickers number (Hv) as described hereinafter. The metallic shaft 10 has a diameter-increased section 11 (e.g., 5 mm in diameter) at a middle portion and diameter-reduced sections 12, 13 (e.g., 4 mm in diameter) at right and left end portions. The left ended diameter-reduced section 13 has a dowel 14 to connectedly interfit into the lid plate 30.

As a raw material, the metallic shaft 10 is selected from the group (A) enumerated below.
(A1) Age hardened stainless steel (SUS),
(A2) Aluminum based alloy with high Si concentration,
(A3) Die casting and forged material,
(A4) Tungsten based material,
(A5) Oxide based ceramics,
(A6) Carbide based ceramics,
(A7) Nitride based ceramics,
(A8) Boron based ceramics,
(A9) High carbon steel,
(A10) Seam welded pipe.
Note: Attention is drawn to FIGS. 6 and 6a when referring to the ceramic materials.

Figure 4:
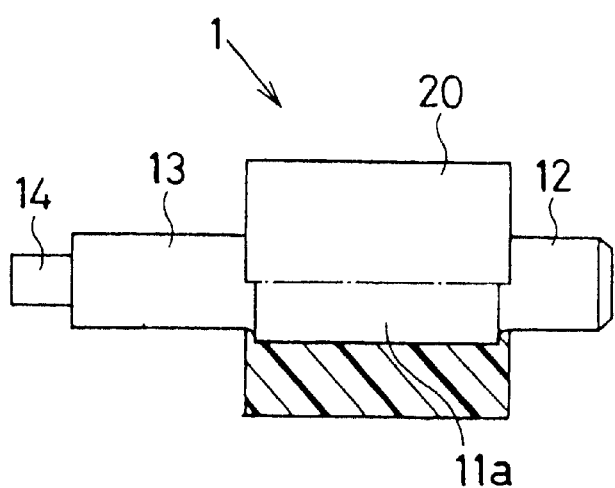
FIG. 4 is a plan view of the frictional hinge device but partly sectioned.
Figure 5:
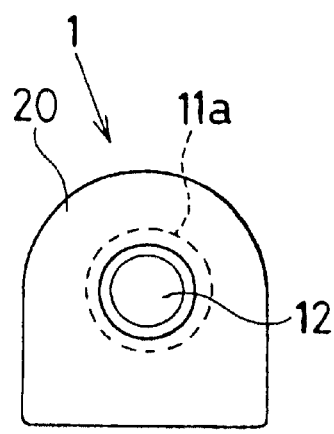
FIG. 5 is a side elevational view of the frictional hinge device.

As shown in FIGS. 4, 5, the support block 20 is formed by a synthetic resin (e.g., PAR (polyarylate) which tightly engages with an outer surface of the diameter-increased section 11 of the metallic shaft 10. In this instance, the synthetic resin pellets are injected into a mold (heated to about 140° C.) in which the metallic shaft 10 was placed in advance.

At the time of molding the synthetic resin around the metallic shaft 10, the mold is preheated to approx. 140° C.

This produces a predetermined quantity of a surface friction resistance between the support block 20 and the metallic shaft 10 due to a residual stress caused from a shrinkage allowance appeared when the synthetic resin is solidified. That is to say, the residual stress creates surface friction resistance between the support block 20 and the metallic shaft 10 when the synthetic resin cools and shrinks.

The frictional hinge device 1 holds the lid plate 30 at any angular position in relation to a main frame of the personal computer 32. For this reason, it is necessary to adjust the frictional torque between the metallic shaft 10 and the support block 20 when the torque is less than a predetermined value. While it is necessary to provide a smooth pivotal movement with the metallic shaft 10 when the frictional torque is greater than the predetermined value.

In order to meet the above requirements, it is necessary to impart 800 or more in terms of Vickers number (Hv) with an outer surface of the diameter-increased section 11 of the metallic shaft 10 in which the support block 20 tightly engages against the metallic shaft 10. This is carried out by selecting the material from the group (A) or providing a surface treatment on the metallic shaft 10.

Upon providing the surface treatment on the metallic shaft 10, an appropriate material is selected from the group (A). On the selected material, one of working methods is provided among treatments specified below.
(a) Cold forging formation,
(b) Die casting formation,
(c) Carbon impregnation hardening,
(d) High frequency quenching,
(e) Nitrogenization.

When providing the surface treatment on the selected material, the working treatments (a), (b) and the heat treatments (c), (d), (e) may be properly combined one by one.

The metallic shaft 10 is 800 or more in terms of Vickers number (Hv) because an initial sticking decreases upon pivoting the support block 20 against the metallic shaft 10 with the least quantity of the stickslip. On the contrary, the initial sticking increases upon pivoting the support block 20 against the metallic shaft 10 with the increased quantity of the stickslip when the metallic shaft 10 is less than 800 in terms of Vickers number (Hv).

Figure 7:
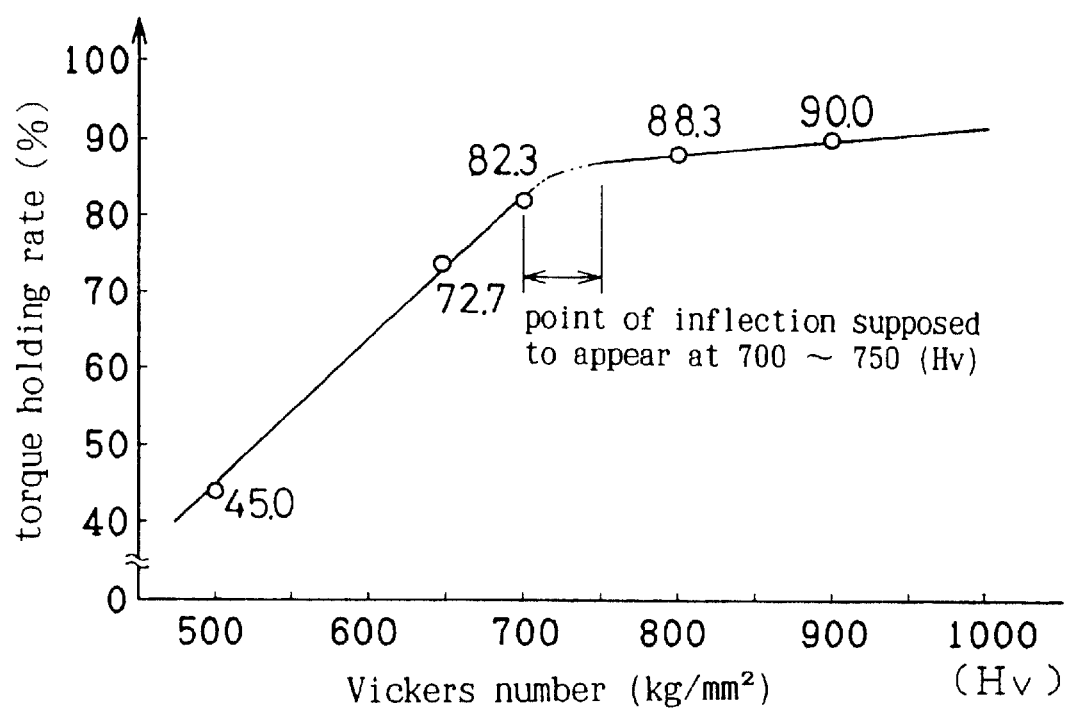
FIG. 7 is a characteristic curve showing a relationship between Vickers number and a torque holding rate.

FIG. 7 shows a relationship between Vickers number (Hv) and a torque holding rate (%) when PAR (polyarylate) is used to the support block 20 with the diameter-increased section 11 as 5 mm in diameter and the diameter-reduced sections 12, 13 as 4 mm in diameter. In this instance, the torque holding rate (%) is expressed by {(frictional torque measured after undergoing a heat deteriorating experimental test or endurance experimental test)/(initial torque)}×100. As observed from FIG. 7, since an inflection point is supposed to present as a local maximum of the torque holding rate when Vickers number (Hv) is between 700 and 750, the frictional hinge device 1 works excellently as a practical tool when Vickers number (Hv) is 800 or more.

It is to be noted that the surface friction resistance is appropriately determined between the metallic shaft 10 and the support block 20 based on the dimensional relationship thereof when designing the frictional hinge device 1.

Instead of processing the metallic shaft 10 with the surface treatment, a hardened layer can be used as a modified form. The hardened layer is coated on the outer surface of the metallic shaft 10 as expediently designated at 11a in FIGS. 2 and 3. The hardened layer 11a coated on the outer surface of the metallic shaft 10 is at least 5.0 $\mu$m in thickness.

Figure 8:
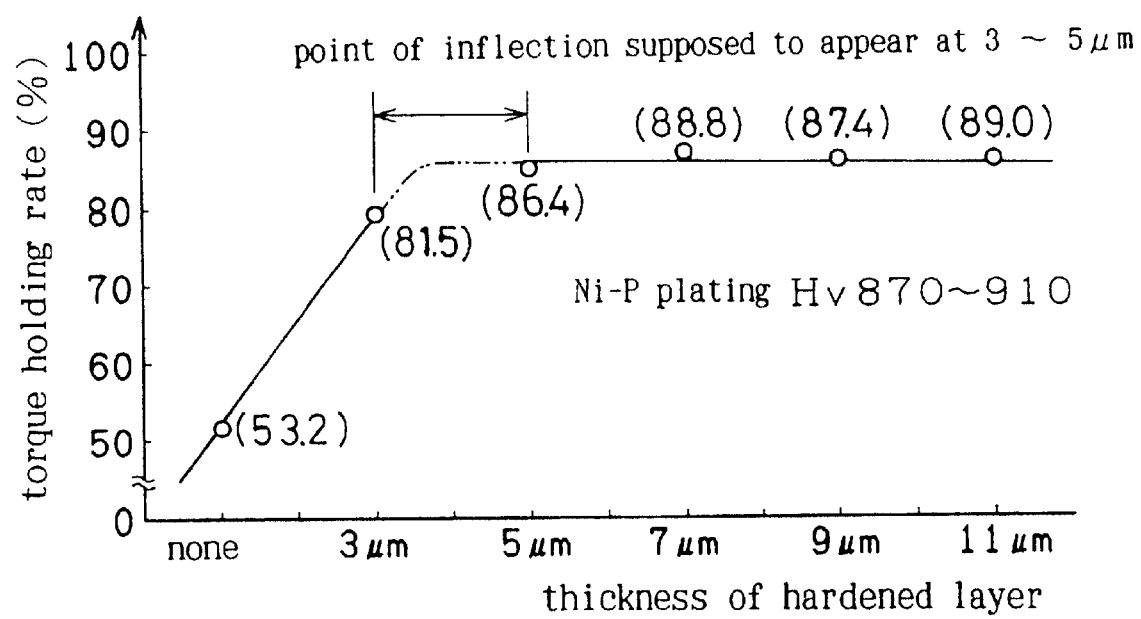
FIG. 8 is a characteristic curve showing a relationship between a thickness of a hardened layer and the torque holding rate.

As observed from FIG. 8, since an inflection point is supposed to present as a local maximum of the torque holding rate when the thickness is between 3.0 $\mu$m and 5.0 $\mu$m, the frictional hinge device 1 works excellently as a practical tool when the thickness is at least 5.0 $\mu$m.

Figure 9:
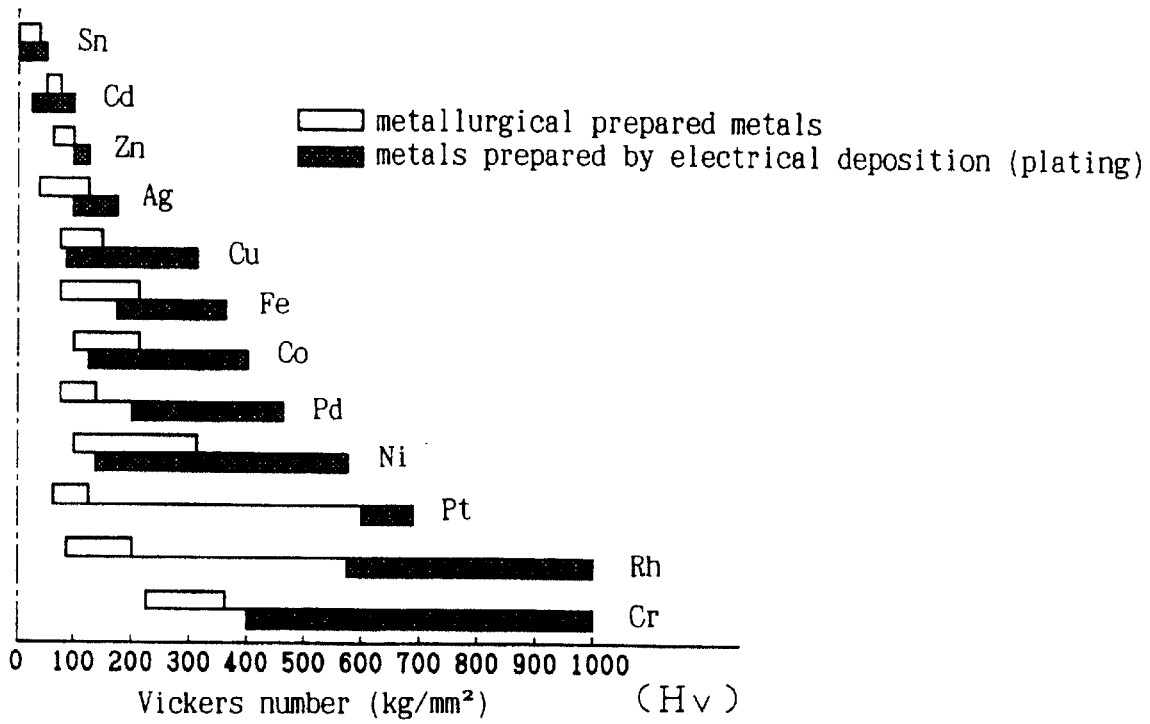
FIG. 9 is a graphic chart showing Vickers number of various metal platings.

Following are methods to provide the metallic shaft 10 with the hardened layer 11a (at least 5.0 $\mu$m in thickness) which is 800 or more in terms of Vickers number (Hv).
(1) Plating method: Rh-plating, non-electrolytic Ni-phosphorus plating, hardened Cr-plating or an alloy plating in which alumina, SiC, WC, TiC, BC, $SiO_2$ or $TiO_2$ is dispersed in non-electrolytic Ni-phosphorus plating or electrical plating (see FIG. 9).
(2) Spraying method: plasma spraying or ceramic coating based on W, Co, $Al_2O_3$, $TiO_2$, WC and TiC.
(3) Ion plating method: ion plating based on TiC, TiN and CrN.
(4) Sputtering method: CVD (Chemical Vapor Deposition) based on TiC, TiN, $TiB_2$ or SiC (ceramic materials).

Among the working methods enumerated above, the hardened Cr-plating is applied in industrial use with Vickers number (Hv) in 800~1000. When thermally treating the non-electrolytic Ni-phosphorus plating at approx. 400° C., Vickers number (Hv) reaches approx. 1000.

For a compound film in which alumina or SiC particles are dispersed, it exhibits approx. 600 in terms of Vickers number (Hv). When the compound film is thermally treated at approx. 400° C., Vickers number (Hv) reaches 1300~1400 depending on SiC concentration (2~6% by weight). Ni—W based alloy plating is exceedingly important as a hardened plating representation.

The synthetic resin suited for the support block 20 has been sought for since the metallic shaft 10 tightly engages against the support block 20 while permitting the metallic shaft 10 to pivotally move within the support block 20.

In order to provide the metallic shaft 10 with a stable surface friction resistance, the synthetic resin used to the support block 20 needs a smaller fluctuation of a bending elasticity (GPa) under an operating temperature ranging from e.g., −20 to 80° C.

Figure 10:
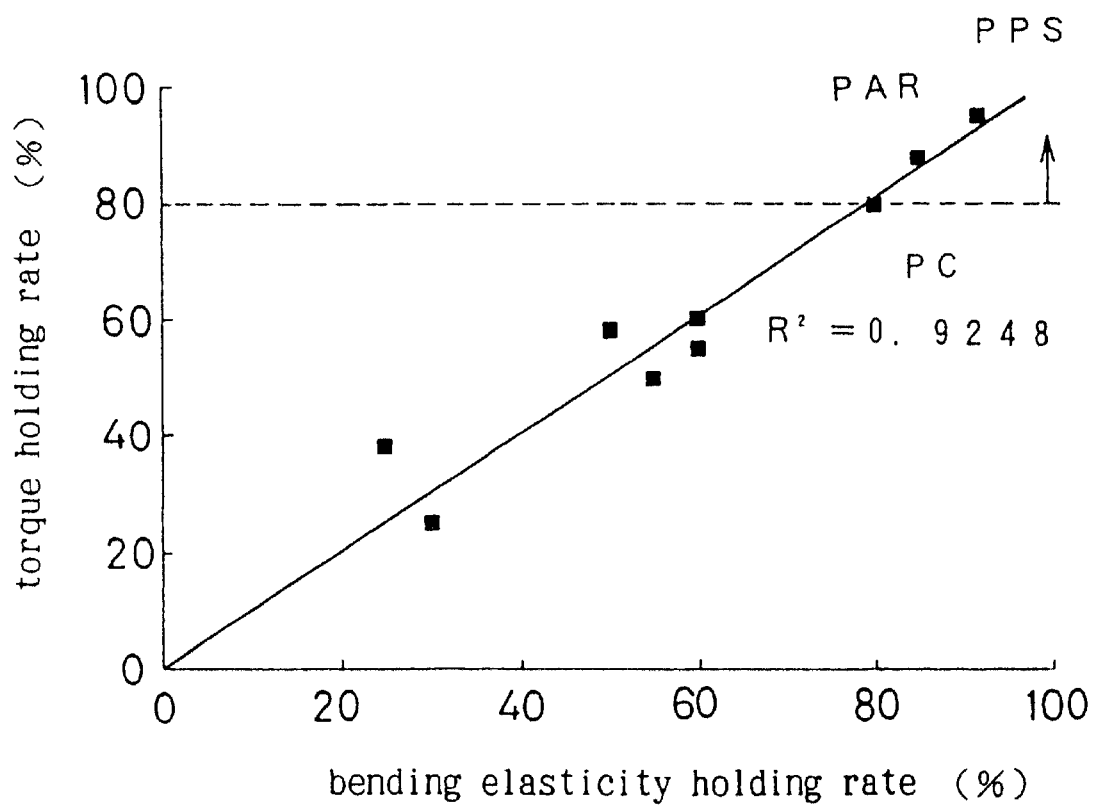
FIG. 10 is a characteristic representation showing a relationship between a bending elasticity holding rate and the torque holding rate on a variety of synthetic resins.

This is based on a graphical representation in FIG. 10 which represents a relationship between a torque holding rate and bending elasticity holding rate in which the torque holding rate of 80% or more corresponds to the bending elasticity holding rate of 80% or more. By using the synthetic resin having a higher bending elasticity holding rate (i.e., smaller fluctuation of the bending elasticity under the predetermined operating temperature range), it is possible to achieve a higher torque holding rate.

Figure 11:
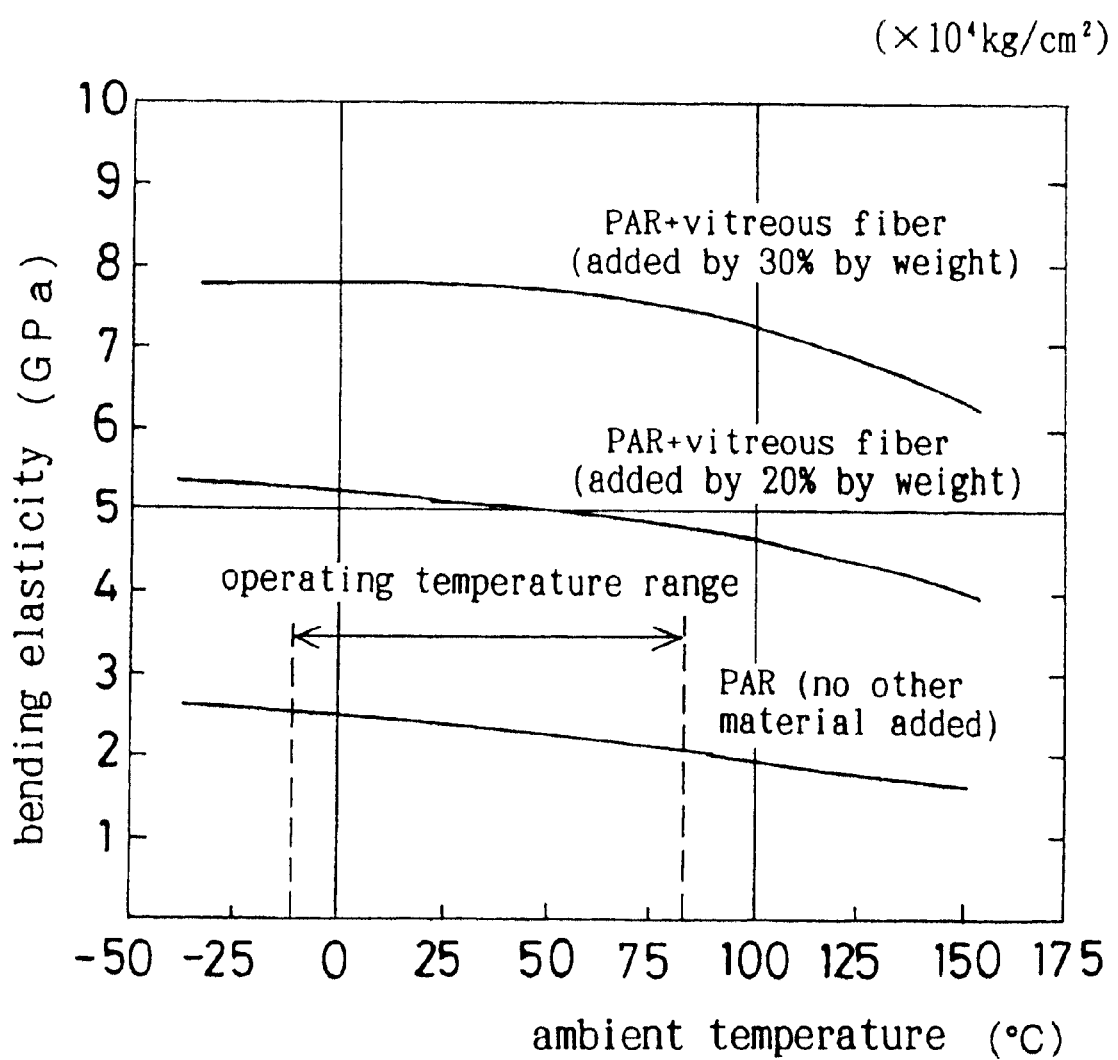
FIG. 11 is a characteristic curve showing a relationship between a bending elasticity and temperature on the synthetic resins in which a fluctuation of the bending elasticity is relatively small.
Figure 12:
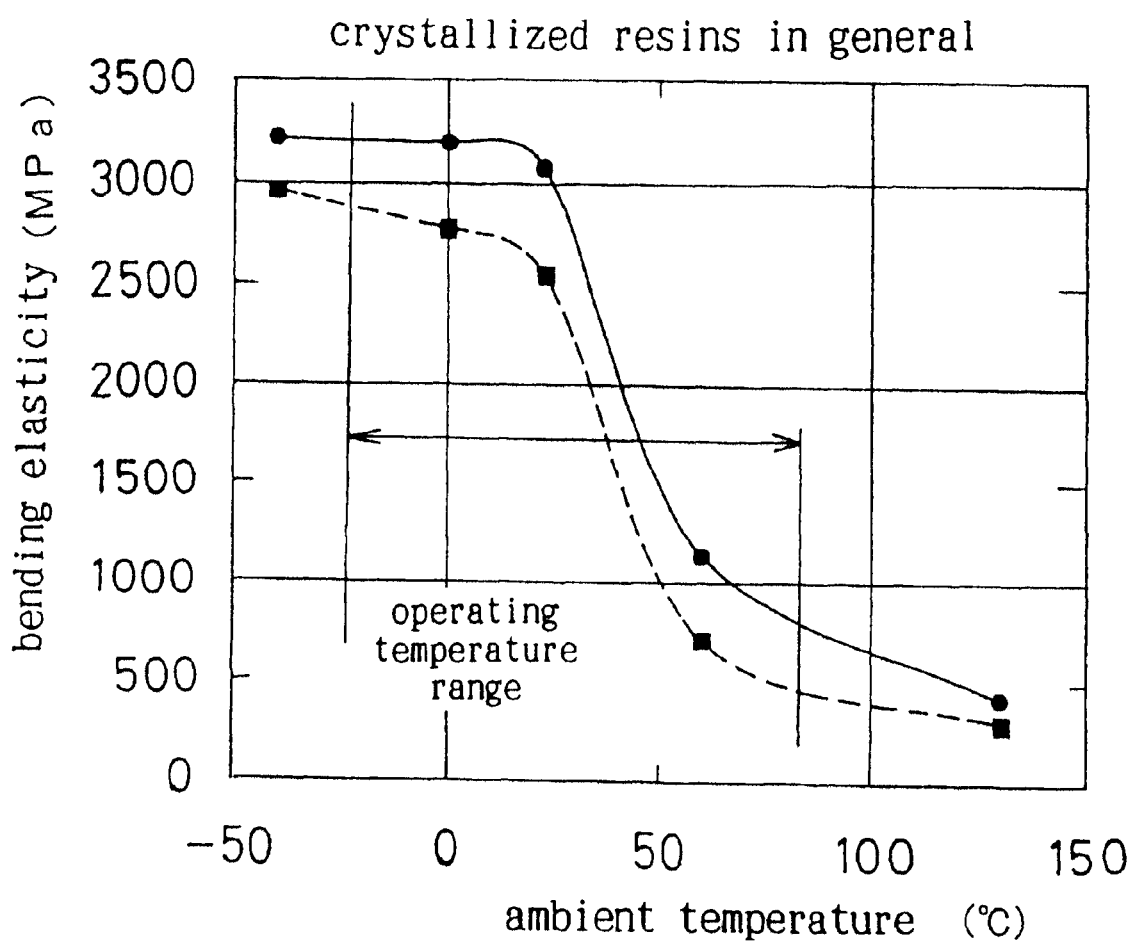
FIG. 12 is a characteristic curve showing a relationship between the bending elasticity and the temperature on crystallized resins in general for the purpose of comparing with the curve in FIG. 11.

FIGS. 11, 12 show a relationship between the bending elasticity holding rate and the ambient temperature. As depicted in FIG. 11, PAR (polyarylate) is suited to the synthetic resin for the support block 20 from the reason that the bending elasticity does not fluctuate significantly under the ambient temperature in which the personal computer 32 is placed. In the crystallized resins used in general, the bending elasticity fluctuates greatly under the operating temperature. When these crystallized resins are applied to the support block 20, an operating temperature range is selected so that the resins exhibit such properties as to provide an appropriate surface friction resistance between the metallic shaft 10 and the support block 20.

With this in mind, the synthetic resins are selected from below which loses less physical properties when crystallized.

These synthetic resins are PAR (polyarylate), PC (polycarbonate), PPS (polyphenylene sulphide), PES (polyether sulfone), PEEK (polyether ether ketone) and the like.

As a modification form, the outer surface of the metallic shaft 10 can be polished by buffing in order to have a surface roughness (Ra) ranging from 0.15 to 0.35 μm after the metallic shaft 10 has been subjected to the surface treatment.

As a second embodiment of the invention, added to the above synthetic resin is an organic and inorganic based antifriction medium (within 15% by weight) such as fluoro-based resin, olefine-based resin, graphite, carbon fiber, talc, vitreous particles, molybdate bisulfide, potassium titanate or the like.

Figure 13:
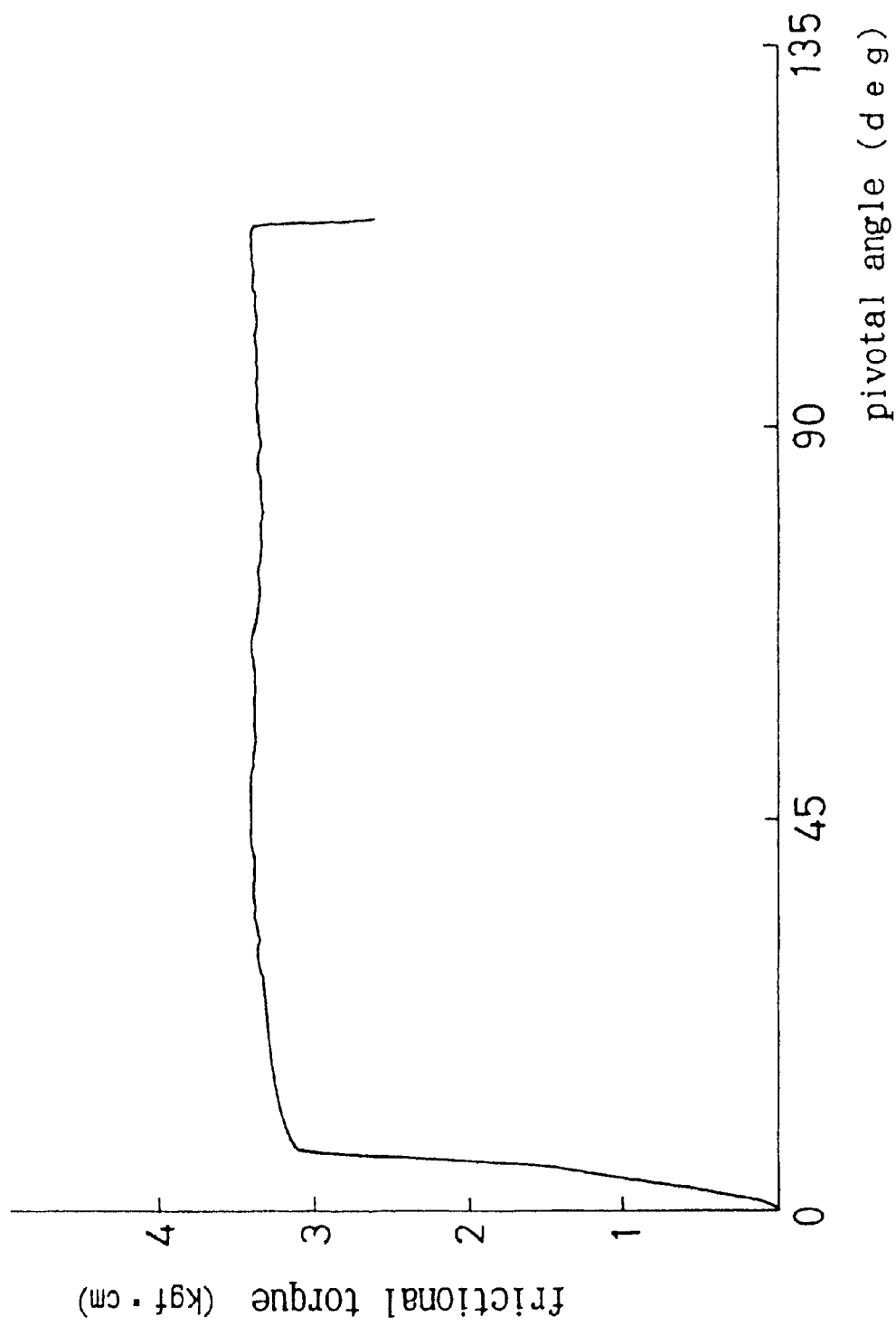
FIG. 13 is a characteristic curve showing a relationship between a pivotal angle and a frictional torque according to a second embodiment of the invention when an antifriction medium is added to the synthetic resin of a support member.
Figure 14:
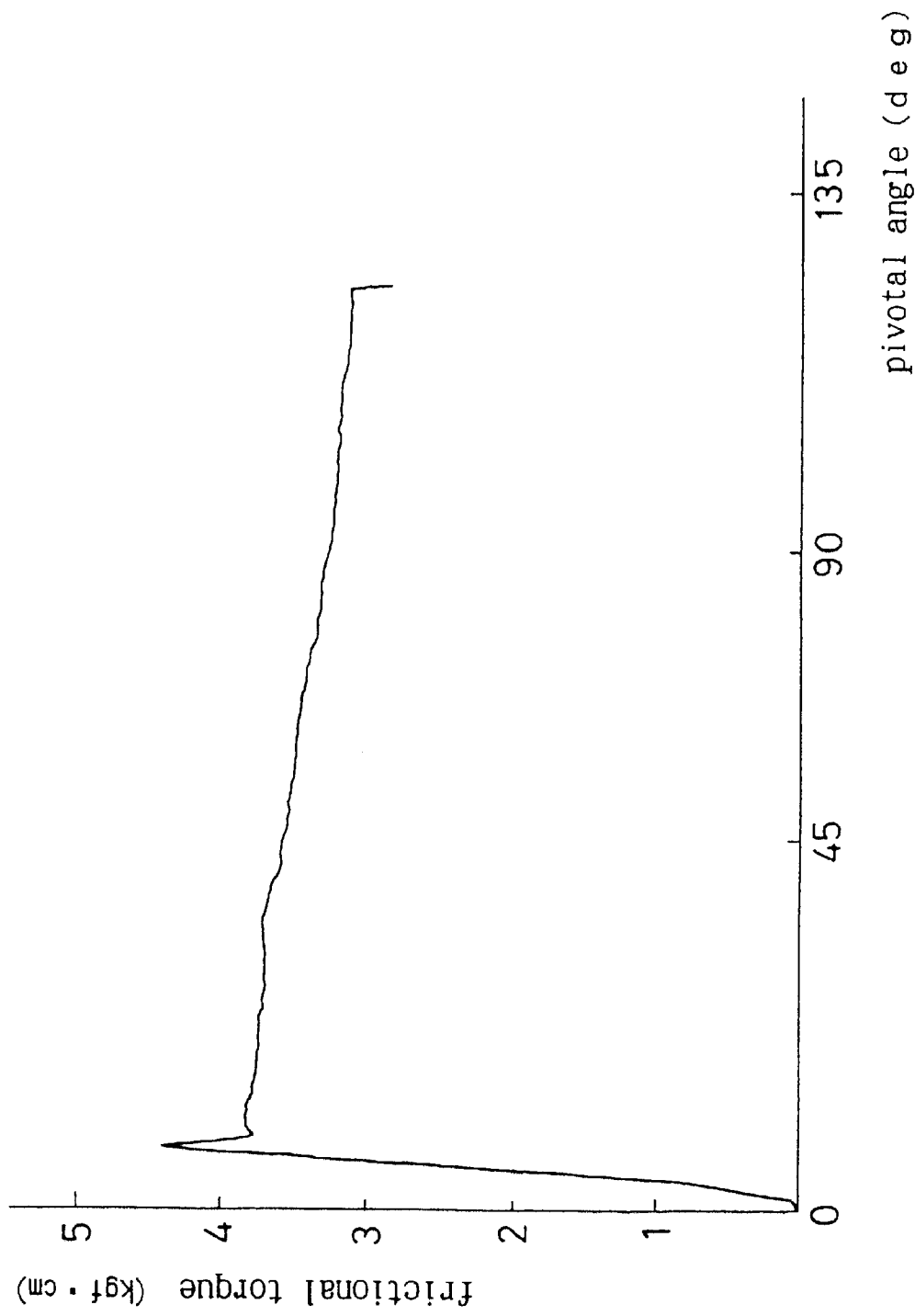
FIG. 14 is a characteristic curve showing a relationship between the pivotal angle and the frictional torque in reference to the curve in FIG. 13 when an antifriction medium is not added to the synthetic resin of the support member.

By comparing the curve in FIG. 13 in which PTFE (polytetrafluoroethylene) is added by 3% by weight to the synthetic resin with the curve in FIG. 14 in which PTFE is not added, it is readily found that the metallic shaft 10 can pivot smoothly from the beginning when PTFE is added. This substantially reduces the wear dust due to the friction between the metallic shaft 10 and the support block 20.

Figure 15:
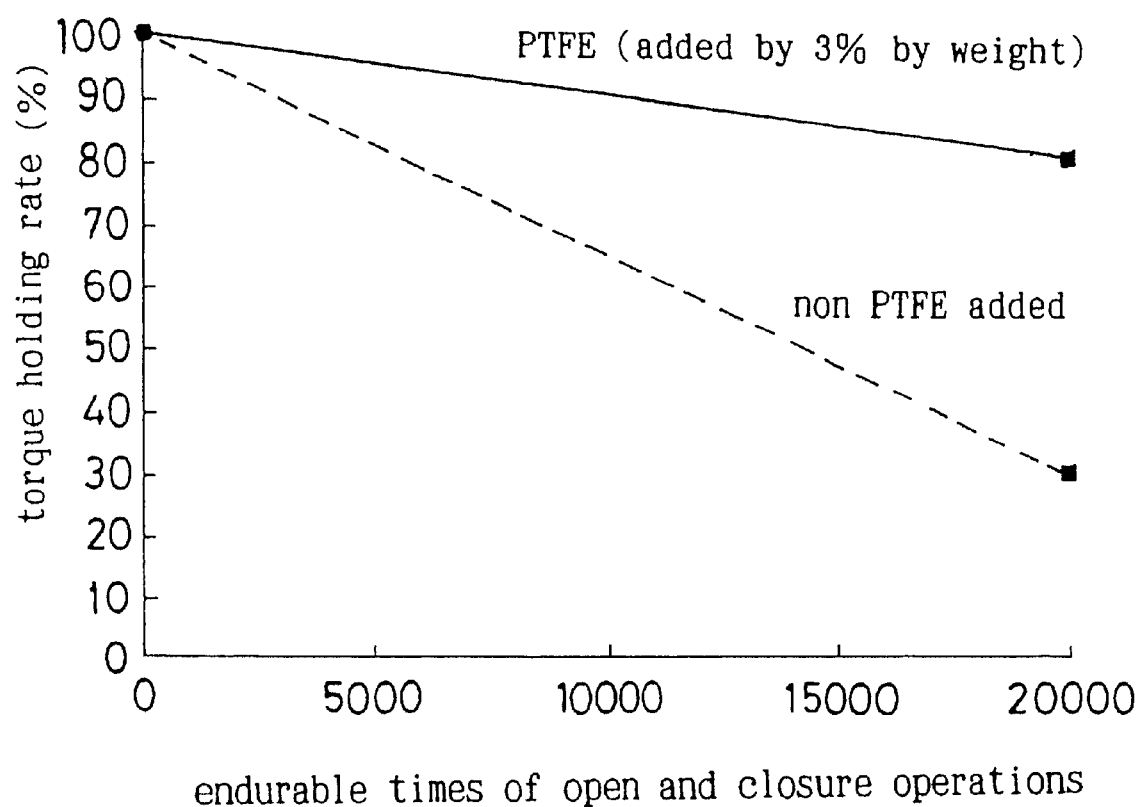
FIG. 15 shows a linear relationship between an endurance limit and the torque holding rate to compare the case in which the antifriction medium is added and the case in which the antifriction medium is not added to the synthetic resin of the support member.

FIG. 15 compares the endurance in which the antifriction medium is added with the endurance in which the antifriction medium is not added. When the antifriction medium is added, reduction of the torque holding rate is practically inappreciable, thereby leading to a long period of service life.

As a third embodiment of the invention, added to the synthetic resin is mineral, vitreous fiber, carbon fiber or the like within 40% by weight so as to impart the support block 20 with a sufficient mechanical strength when forming the support block 20 in integral with the metallic shaft 10.

Figure 16:
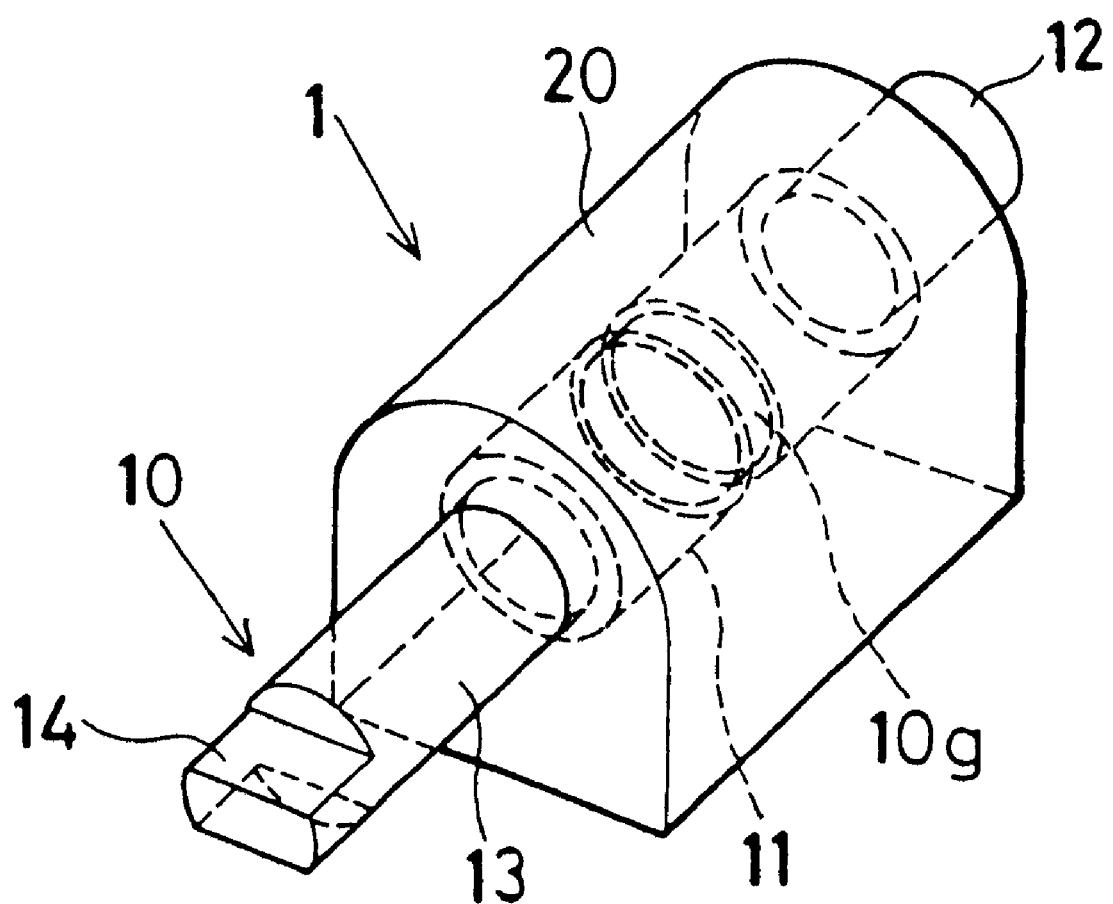
FIG. 16 shows a perspective view of the frictional hinge device in which one circumferential groove is provided on an outer surface of the metallic shaft member.
Figure 17:
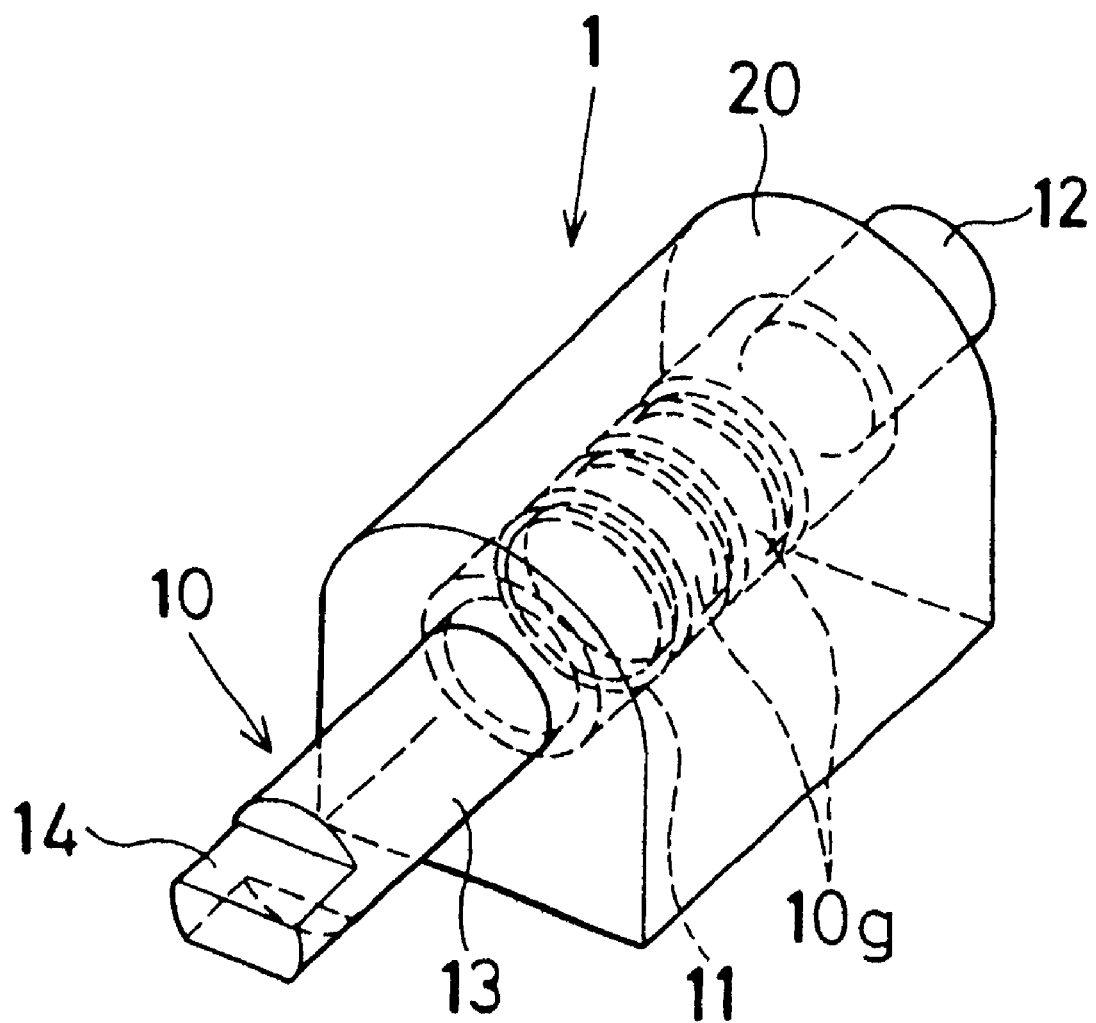
FIG. 17 is a perspective view of the frictional hinge device when three circumferential grooves are provided on the outer surface of the metallic shaft member.
Figure 18:
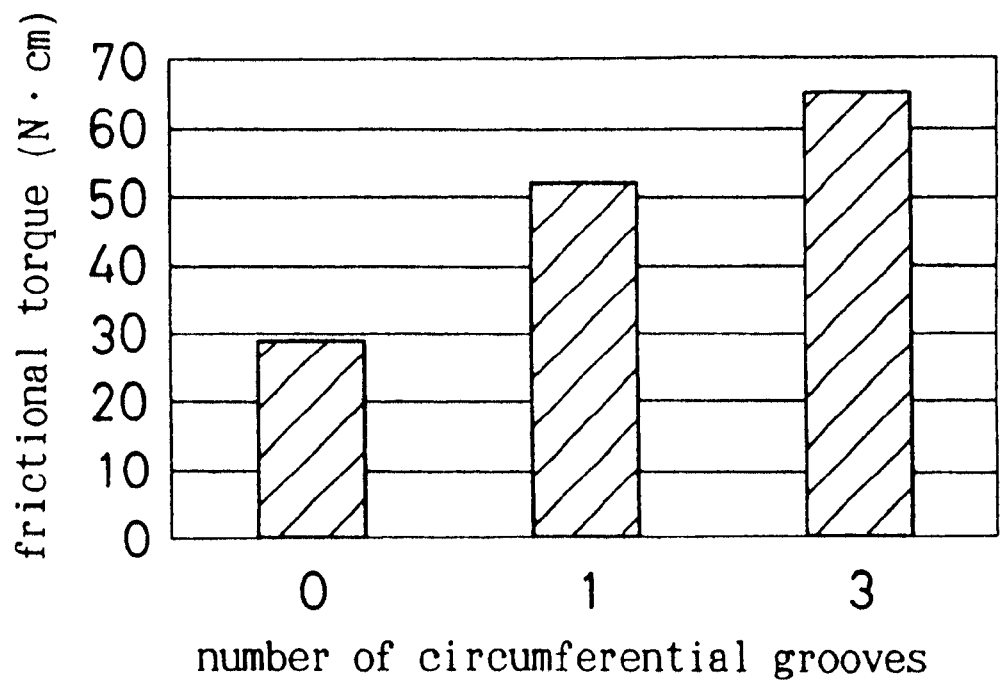
FIG. 18 is a graphic chart showing a relationship between the frictional torque and the number of the circumferential grooves.

FIGS. 16 and 17 show modification forms in which one and three circumferential grooves 10g are provided on the outer surface of the metallic shaft 10 in addition to the hardened layer 11a or the surface treatment. With the circumferential groove or grooves thus provided, the support block 20 tends to engage more tightly against the metallic shaft 10 so that the surface friction resistance is reinforced between the support block 20 and the metallic shaft 10 so as to insure a higher frictional torque therebetween as observed from FIG. 18. This makes the frictional hinge device 1 compact as a whole in comparison with the higher frictional torque insured.

In this instance, the number of the circumferential grooves 10g are not confined to one or three, a plurality of the circumferential grooves (e.g., two or four) can be naturally provided as desired.

As understood from the foregoing description, the metallic shaft 10 is determined to be 800 or more in terms of Vickers number (Hv) by selecting the appropriate material or providing the surface treatment. This increases the torque holding rate to tightly engage the support block 20 against the metallic shaft 10. This eliminates variations on the frictional torque, the stickslip phenomenon, the abnormal noise and the initial sticking upon pivoting the support block 20 against the metallic shaft 10 so as to maintain a stable surface friction resistance with a good endurance.

This enables to hold the lid plate 30 at the desired angular position with a comfortable operation when the lid plate 30 is hand freed at an appropriate upward or downward position.

Further, by molding the support block 20 with the synthetic resin around the metallic shaft 10, it is possible to reduce a manufacturing cost.

With the smaller fluctuation of the bending elasticity used to the synthetic resin, it is possible to maintain the stable surface friction resistance against the metallic shaft 10 under various operating environments, thereby making it easy to use the lid plate 30 of the portable business device.

It is to be noted that the hardened layer 11a may be polished by buffing to impart it with a smaller surface roughness (Ra). When the surface roughness (Ra) is within the range of 0.15~0.35 μm, the hardened layer 11a is used unpolished.

It stands as a matter of course that the metallic shaft 10 can be used without the hardened layer 11a so long as the metallic shaft 10 exhibits 800 or more in terms of Vickers number (Hv).

It is to be observed that instead of the lid plate of the note type personal computer, the frictional hinge device may be applied to various lid plates for a copy machine, porcelain toilet, automobile hatch, hood, carrier side plates of trucks, windows of living houses and keyboards of pianos.

The frictional hinge device can be applied to any article in which a lid plate is held at any desired angular position by the surface friction resistance between the metallic shaft member and the support member.

While there has been described what is at present thought to be preferred embodiments of the invention, it will be understood that modifications may be made therein and it is intended to cover in the appended claims all such modifications which fall within the scope of the invention.

What is claimed is:

1. A frictional hinge device comprising:
   a metallic shaft member having a rotational axis as a rotational center;
   a support member which rotationally supports said rotational axis at said metallic shaft member;
   said support member being arranged so that said support member is relatively rotatable in relation with said metallic shaft member, and held at any angular position with a surface friction resistance between said support member and said metallic shaft member;
   said support member being molded around said metallic shaft member when a powdered synthetic resin is injected into a mold, so as to establish said surface friction resistance between said support member and said metallic shaft member due to a residual stress created therebetween when said synthetic resin cools and shrinks;
   a hardened layer is provided around said outer surface of said metallic shaft member, said hardened layer having Vickers number (Hv) of 800 or more and said hardened layer having a thickness of at least 5.0 μm;
   wherein said surface friction resistance between said support member and said metallic shaft member is adapted to be altered in response to a torque required to hold said support member at a desired angular position by adjusting a hardness of said hardened layer.

2. The frictional hinge device as set forth in claim 1, wherein an outer surface of said metallic shaft member has one or more circumferential grooves to reinforce said surface friction resistance between said support member and said metallic shaft member when said synthetic resin is molded around said metallic shaft.

3. A portable business device in which the frictional hinge device as set forth in claim 1 is used to pivotably support a display thereof so as to hold said display at a desired angular position.

* * * * *